(12) United States Patent
Gupta et al.

(10) Patent No.: US 6,703,076 B1
(45) Date of Patent: Mar. 9, 2004

(54) PRODUCTION OF CATALYST LAYERS ON DIAPHRAGMS FOR LOW-TEMPERATURE FUEL CELLS

(75) Inventors: Ashok Kumar Gupta, Julich (DE); Frank Tietz, Julich (DE); Hans Peter Buchkremer, Heinsberg (DE); Isabel Kundler, Konigstein (DE)

(73) Assignee: Forschungszentrum Julich GmbH, Julich (DE)

( * ) Notice: Subject to any disclaimer, the term of this patent is extended or adjusted under 35 U.S.C. 154(b) by 43 days.

(21) Appl. No.: 10/070,009

(22) PCT Filed: Oct. 14, 2000

(86) PCT No.: PCT/EP00/10129
§ 371 (c)(1),
(2), (4) Date: Feb. 28, 2002

(87) PCT Pub. No.: WO01/31725
PCT Pub. Date: May 3, 2001

(30) Foreign Application Priority Data

Oct. 28, 1999 (DE) .......................... 199 51 936

(51) Int. Cl.[7] .............. B05D 3/02; B05D 3/12
(52) U.S. Cl. .............. 427/282; 427/370; 427/379; 427/385.5
(58) Field of Search ................ 427/370, 282, 427/379, 385.5; 429/42, 12

(56) References Cited

U.S. PATENT DOCUMENTS

| | | | | |
|---|---|---|---|---|
| 5,211,984 A | * | 5/1993 | Wilson | 427/115 |
| 5,234,777 A | * | 8/1993 | Wilson | 429/33 |
| 5,330,860 A | | 7/1994 | Grot et al. | 429/42 |
| 5,447,636 A | * | 9/1995 | Banerjee | 210/638 |
| 5,561,000 A | * | 10/1996 | Dirven et al. | 429/42 |
| 5,843,519 A | * | 12/1998 | Tada | 427/115 |
| 5,861,222 A | | 1/1999 | Fischer et al. | 429/42 |
| 5,879,828 A | * | 3/1999 | Debe et al. | 429/41 |
| 6,156,449 A | * | 12/2000 | Zuber et al. | 429/42 |

FOREIGN PATENT DOCUMENTS

| | | | |
|---|---|---|---|
| DE | 3334330 | | 4/1985 |
| DE | 19616160 | | 10/1997 |
| EP | 0945910 | | 9/1999 |
| JP | 06-203848 | * | 7/1994 |
| JP | 06-203849 | * | 7/1994 |

OTHER PUBLICATIONS

Wilson et al, J. Electrochem. Soc., 139(2), pp. L28–L30, 1992.*
Wilson et al, J. of Applied Electrochemistry, 22(1), pp. 1–7, 1992.*

* cited by examiner

*Primary Examiner*—Erma Cameron
(74) *Attorney, Agent, or Firm*—Merchant & Gould P.C.

(57) ABSTRACT

The invention concerns a process for applying catalytically active material to a polymer diaphragm for low-temperature fuel cells.

In accordance with the invention a non-polar solvent, catalytically active material and a polymer solution are processed to form a paste. The paste is applied to the diaphragm in layer form, in particular by screen printing. Then the paste is dried and pressed to the diaphragm with the application of heat.

Swelling of the diaphragm is avoided by virtue of the presence of non-polar solvents. It is therefore possible to produce the desired product with a few processing steps. Material losses are minimized by the provision of the screen printing procedure.

Overall therefore the process is simple and inexpensive.

5 Claims, No Drawings

PRODUCTION OF CATALYST LAYERS ON DIAPHRAGMS FOR LOW-TEMPERATURE FUEL CELLS

This application is the national phase of PCT/EP00/10129, filed Oct. 14. 2000.

The invention concerns the production of a catalyst layer on a diaphragm for low-temperature fuel cells.

DE 44 30 958 C1 and DE 195 31 852 C1 disclose fuel cells comprising a cathode, an electrolyte and an anode. An oxidation agent (for example air) is fed into a passage or space adjoining the cathode and fuel (for example hydrogen) is fed into a passage or space adjoining the anode.

The operating agents pass to the electrodes and are depleted there. The depleted operating agents then issue again and are passed out of the fuel cell.

At the anode of the fuel cell known from DE 195 31 852 C1 protons are formed in the presence of the fuel by means of a catalyst. The protons pass through a diaphragm provided as the electrolyte and are combined on the cathode side with the oxygen originating from the oxidation agent to form water. Electrons are liberated at the anode and electrical energy is generated in that way.

Catalyst layers are applied on both sides of a diaphragm in a low-temperature fuel cell. The diaphragm comprises polymer material, thus for example Nafion®. In general terms a respective porous gas diffusion layer is applied to the layers which comprise catalyst material. The gas diffusion layer serves both for distribution of the reactands and also for carrying away the current.

In a production process the active layer, that is to say the catalyst layer, is applied to a carrier. The carrier is pressed to the diaphragm so that the active layer adjoins the diaphragm. The carrier is then removed.

Although high-quality catalyst layers can be produced with that process, it suffers from the disadvantage that a plurality of processing steps are required. In addition there is the risk of incomplete transfer of the catalyst material onto the diaphragm so that a certain proportion of catalyst material is not put to use.

In order to minimize the number of working steps, the catalyst mixture should be applied directly to the diaphragm. The attempt has therefore been made to spray the active layer, that is to say the layer consisting of catalyst material, onto a gas diffusion layer. In that procedure, carbon-borne noble metal catalysts are used as the material involved. A gas diffusion layer is then joined to the diaphragm on one side by a hot pressing operation. The catalyst layer is then between the diaphragm and the gas diffusion layer.

Admittedly the above-indicated process minimizes the number of production steps. It is found however to suffer from the problem that a solvent is used with that process. Swelling of the diaphragm material could not be avoided by virtue of the solvent. In general then the diaphragm material is distorted so severely that a coating operation is no longer possible.

The above-mentioned problem is resolved with the process known from the publication "M. S. Wilson, S. Gottesfeld, J. Elektrochem. Soc., Vol. 139 (2), L2B, 1992", insofar as the diaphragm is held fast on a vacuum table by means of a reduced pressure while the catalyst material is applied with a stepping motor-controlled spray unit. The process admittedly operates well, but it requires a considerable level of apparatus complication and expenditure. It is therefore comparatively expensive.

DE 197 05 469 C1 discloses a process in which a mask is applied to a substrate by means of a photoresist. Catalyst material such as for example platinum is then applied through the mask to the substrate electrochemically or by sputtering. The photoresist is removed by exposure. A diaphragm is pressed to the catalyst material which is disposed on the substrate. The substrate is finally dissolved away.

The above-indicated process for applying catalyst material to a diaphragm also suffers from the disadvantage of involving a very large number of steps.

The object of the invention is to provide a process with which the catalyst material can be easily and inexpensively applied to a diaphragm.

The object of the invention is attained by a process having the features of the first claim. Advantageous configurations are set forth in the appendant claims.

In accordance with the claim a paste is produced from a non-polar solvent, catalytically active material and a polymer solution. The applied layer is joined to the diaphragm by hot pressing. The solvents escape during that procedure.

Platinum is typically used as the catalytically active material. Nafion® represents an example of a suitable polymer. The solvent used can be a commercially available thin-film diluent, thus for example the thin-film diluent 8470 from DuPont. Such a thin-film diluent substantially comprises a terpineol-isomer mixture to which further components are added in order to improve the wetting of solid substances.

An essential measure according to the invention is the provision of a hydrophobic, that is to say non-polar solvent. More specifically it has been found that polar solvents such as for example water are responsible for swelling of the diaphragm. The problem in regard to swelling is therefore avoided by using hydrophobic solvents (non-polar solvents). This measure therefore makes it possible to directly apply a layer to the diaphragm, press it in a hot condition and thus attain the desired result in a few processing steps.

The temperature during such a working procedure is for example 140° C. In principle the temperature can be so selected that the solvents evaporate during the pressing procedure without in other respects the materials suffering damage. Temperatures around 140° C. usually satisfy those requirements.

The catalytically active material is desirably on a carrier material such as for example carbon. In that way a large catalytically active area is afforded, with the minimum use of catalyst material. The costs for expensive catalytically active material such as for example platinum or rubidium are minimized in that way.

The polymers in the paste serve to join the catalytically active material to the polymer diaphragm. Ideally, the polymer used in the paste is a polymer which constitutes the diaphragm. That ensures to a particular degree that the desired bonding of the catalyst material to the diaphragm is reliably achieved.

The paste can be applied to the polymer diaphragm by a thick-film procedure, thus for example by stencil printing. It is particularly advantageous to use a screen printing process as it is possible to provide a precise metering action in that way. In addition the layers produced by screen printing are particularly homogenous. Material losses are also minimized.

In a screen printing process a screen which is bordered by a frame is applied to the diaphragm. A paste is urged into the pores in the screen by means of a squeegee. The screen is then removed and the paste is present on the diaphragm in layer form. As already mentioned the paste is then pressed to the diaphragm in the hot condition.

It is possible in that way to apply to the diaphragm catalyst layers which for example are between 10 and 100 μm in thickness.

Advantageously the applied paste is initially dried at elevated temperatures prior to the pressing operation. The term elevated temperatures is used to denote temperatures a little above ambient temperature. They are substantially below the temperature at which the layer is pressed to the diaphragm. 50° C. is a suitable drying temperature.

In a further advantageous configuration of the process, besides the polymer material, a further binder is added to the paste in order to strengthen the subsequent bonding of the catalyst material to the diaphragm. It is possible to use conventional binders which are known from screen printing, insofar as they contain hydrophobic solvents. The binders are also to be so selected that the solvents present therein evaporate at the processing temperatures. Evaporation should therefore begin in particular below 140° C.

An example of an additional binder is represented by PHE. This involves phthalic acid bis-(2-ethylhexylester). Polyvinylbuteral (PVB) or ethyl cellulose are further examples of additional binders.

It is further desirable for a plasticizer to be added to the paste. That avoids subsequent crack formation. The above-indicated demands are to be made on the plasticizer. The plasticizer may therefore not contain any polar solvents. In addition solvents must evaporate at the operating temperatures.

Oleic add or phthalic acid bis-(2-ethylhexylester) (PHE) are examples of suitable plasticizers.

Embodiment

Solid material pt/carbon is mixed with agitation with 5% by volume of Nafion solution from DuPont or Fluka 1:2 pt/carbon:Nafion solution so that the mass is homogenously wetted. A subsequent drying procedure at 80° C. results in the solid material being uniformly encased with the polymer. That mass (0.77 g) is then coarsely pulverized and mixed with (2.6 g of) a solvent mixture (thin-film diluent 8470 from DuPont with or without 0.1% by weight of binder). Some drops (0.05 g) of oleic acid or PHE are added and the entire mass is homogenized on a three-roll mill. During the homogenization procedure some solvent is additionally added until a spreadable paste is produced. In that operation previously produced agglomerates are mechanically broken down and a uniform grain size achieved.

That paste is applied to the polymer diaphragm by a thick-film process, in this case with screen printing or with stencil printing. In that way a 10–100 μm catalyst layer can be applied in one coating step. A diaphragm-electrode unit which is coated in that way is finally dried at 50° C. and the layer, that is to say the electrode, is fixed at 130° C. under pressure on the diaphragm.

Due to the stability in respect of shape achieved for the diaphragm during production of the composite assembly the production procedure can be easily converted into mass production.

What is claimed is:

1. A process for producing a diaphragm with applied catalytically active layer for use in low-temperature fuel cells, comprising the following steps:

a) processing at least one hydrophobic solvent, a catalytically active material and a polymer solution to form a paste, which does not contain any hydrophilic solvents;

b) applying the paste in layer form to a polymer diaphragm; and c) pressing the diaphragm with the applied paste with the application of heat so that the at least one solvent escapes and the catalytically active material is fixed on the diaphragm.

2. A process as set forth in claim 1, wherein the paste is applied to the diaphragm in layer form by screen printing.

3. A process as set forth in claim 1, wherein a further binder was added to the paste.

4. A process as set forth in claim 1, wherein a plasticizer was mixed with the paste.

5. A process as set forth in claim 1, wherein the paste applied to the diaphragm in layer form is dried prior to the pressing operation at temperatures of between 30 and 80° C.

* * * * *